United States Patent [19]

Michals

[11] 4,205,351
[45] May 27, 1980

[54] DIGITAL DATA RECORDER

[75] Inventor: Richard A. Michals, Skokie, Ill.

[73] Assignee: Stenograph Corporation, Skokie, Ill.

[21] Appl. No.: 748,511

[22] Filed: Dec. 8, 1976

[51] Int. Cl.² ............................................. G11B 5/00
[52] U.S. Cl. ......................................... 360/4; 360/5;
178/21; 400/94
[58] Field of Search .......................... 360/4, 5; 197/9;
178/21

[56] References Cited

U.S. PATENT DOCUMENTS

| 3,463,884 | 8/1969 | Norman | 360/4 |
| 3,557,927 | 1/1971 | Wright | 197/9 |
| 3,597,538 | 8/1971 | Binenbaum | 197/9 |
| 3,665,115 | 5/1972 | Snook | 197/9 |
| 3,832,733 | 8/1974 | Eldridge | 360/4 |
| 3,892,915 | 7/1975 | Budworth et al. | 197/9 |

Primary Examiner—John H. Wolff
Attorney, Agent, or Firm—Lee & Smith

[57] ABSTRACT

A digital data recorder is adapted for receiving a plurality of parallel input data members for defining a single input signal. Any of the input data members may change in identity during the presentation of the single input signal, and the recorder gives priority identity to any input data member which is of the priority identity for any time during the presentation. The recorder produces a serial, digital data output signal comprising a finite sequence of binary data bits in one-to-one correspondence with the parallel input data members, with the binary state of the bit corresponding to the identity of the input member. The serial, digital output signal is suitable for recording on the single channel of a magnetic tape for fully defining the input signal. The recorder is described in detail as adapted for recording the words taken by a shorthand machine.

15 Claims, 17 Drawing Figures

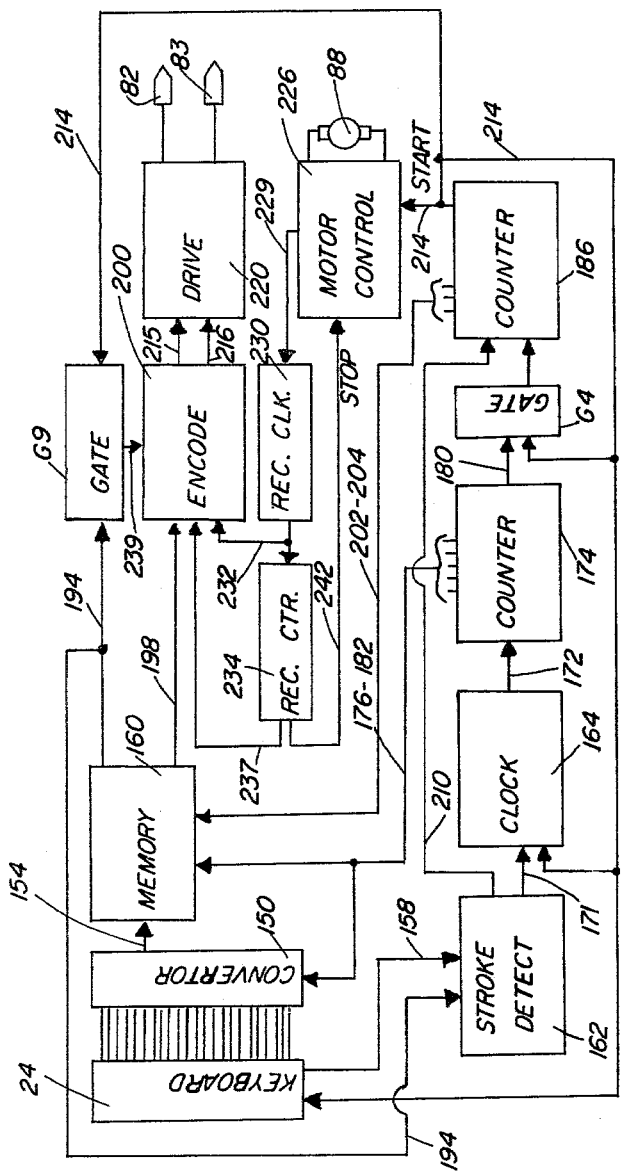

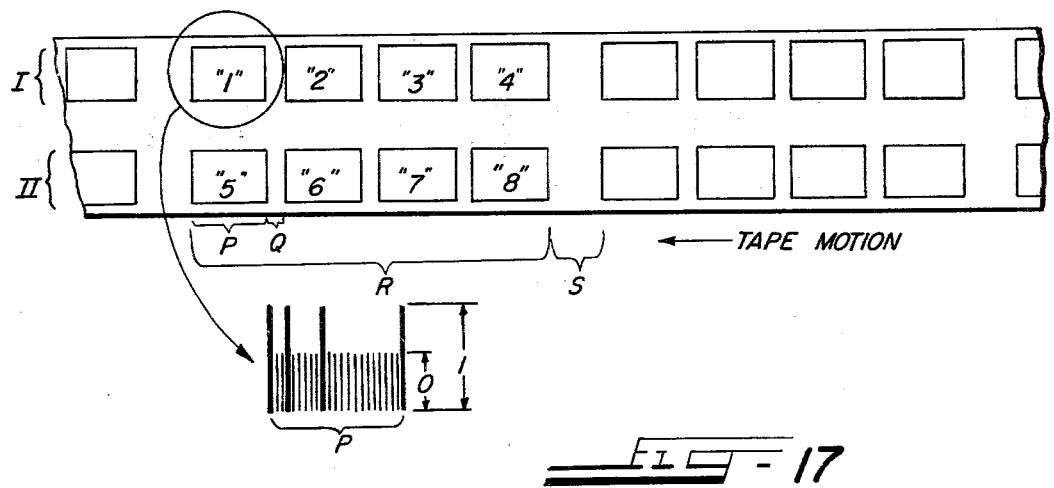
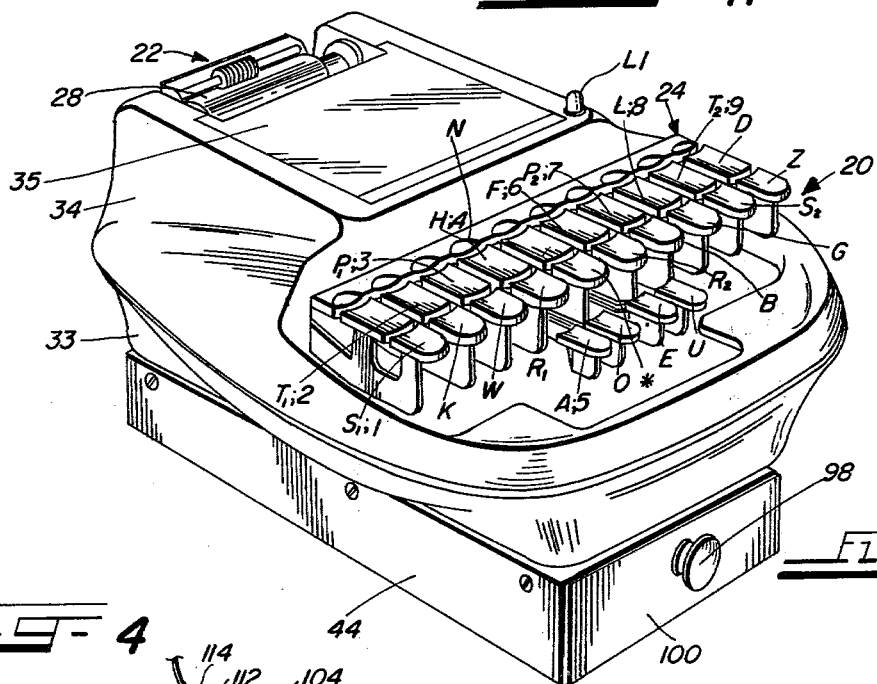
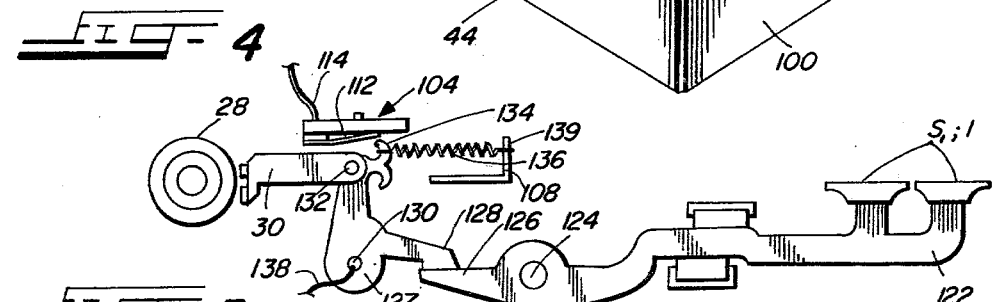
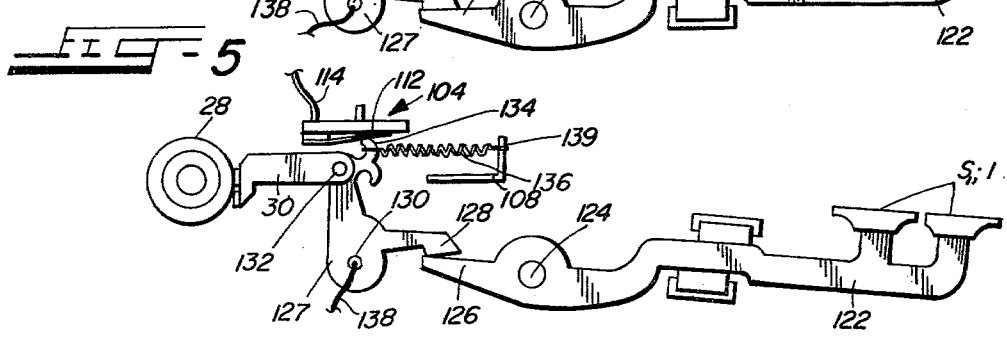

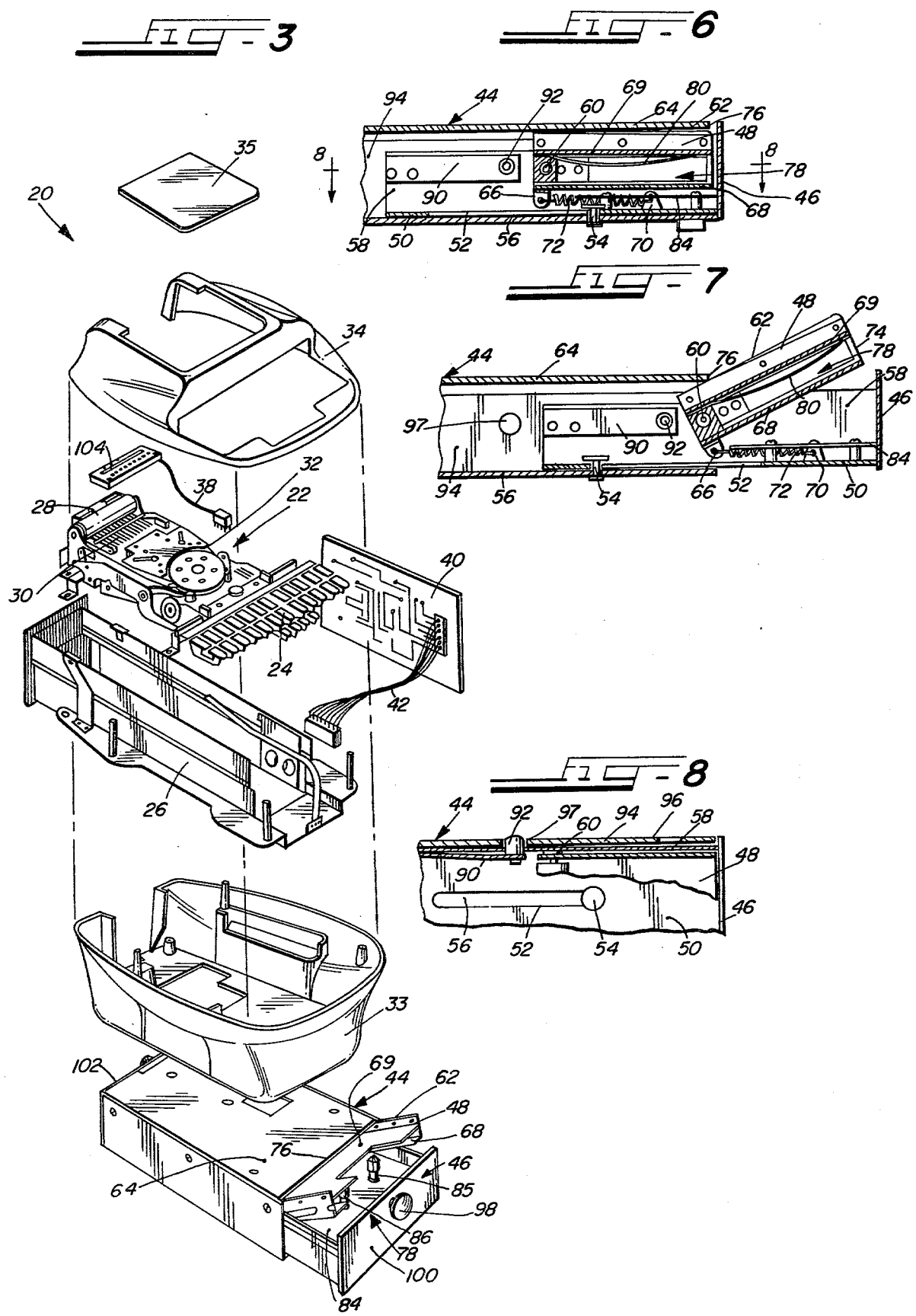

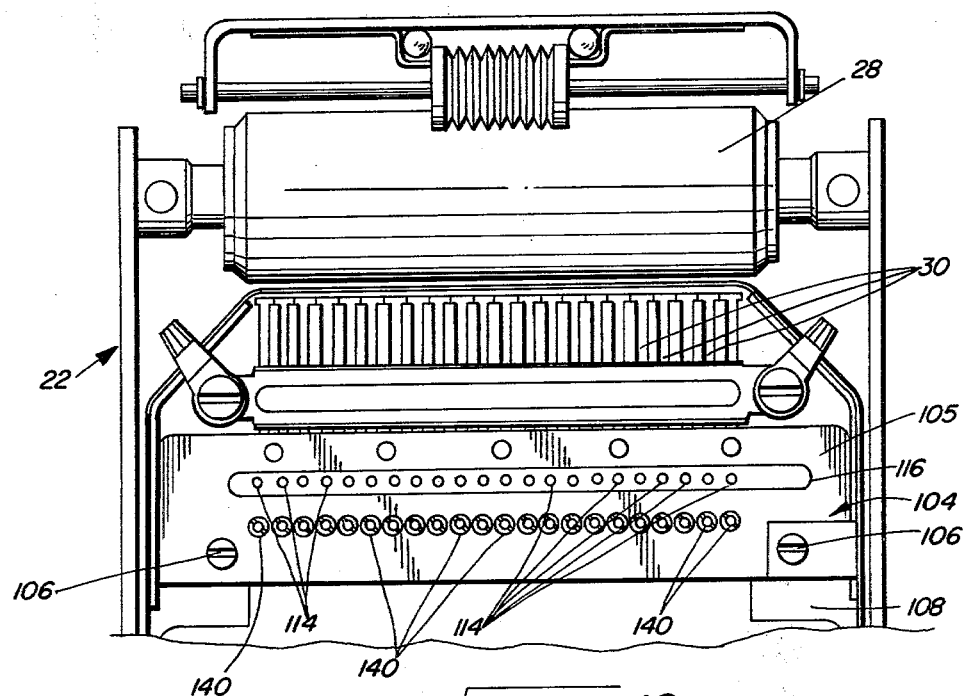
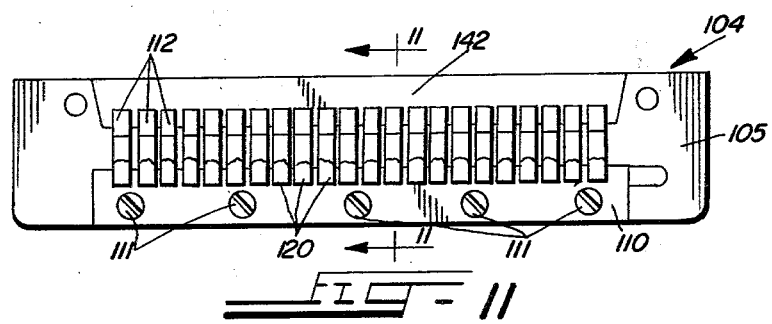
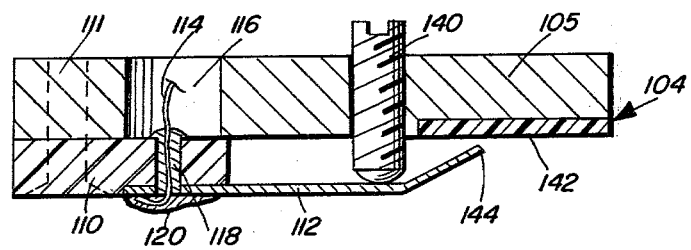

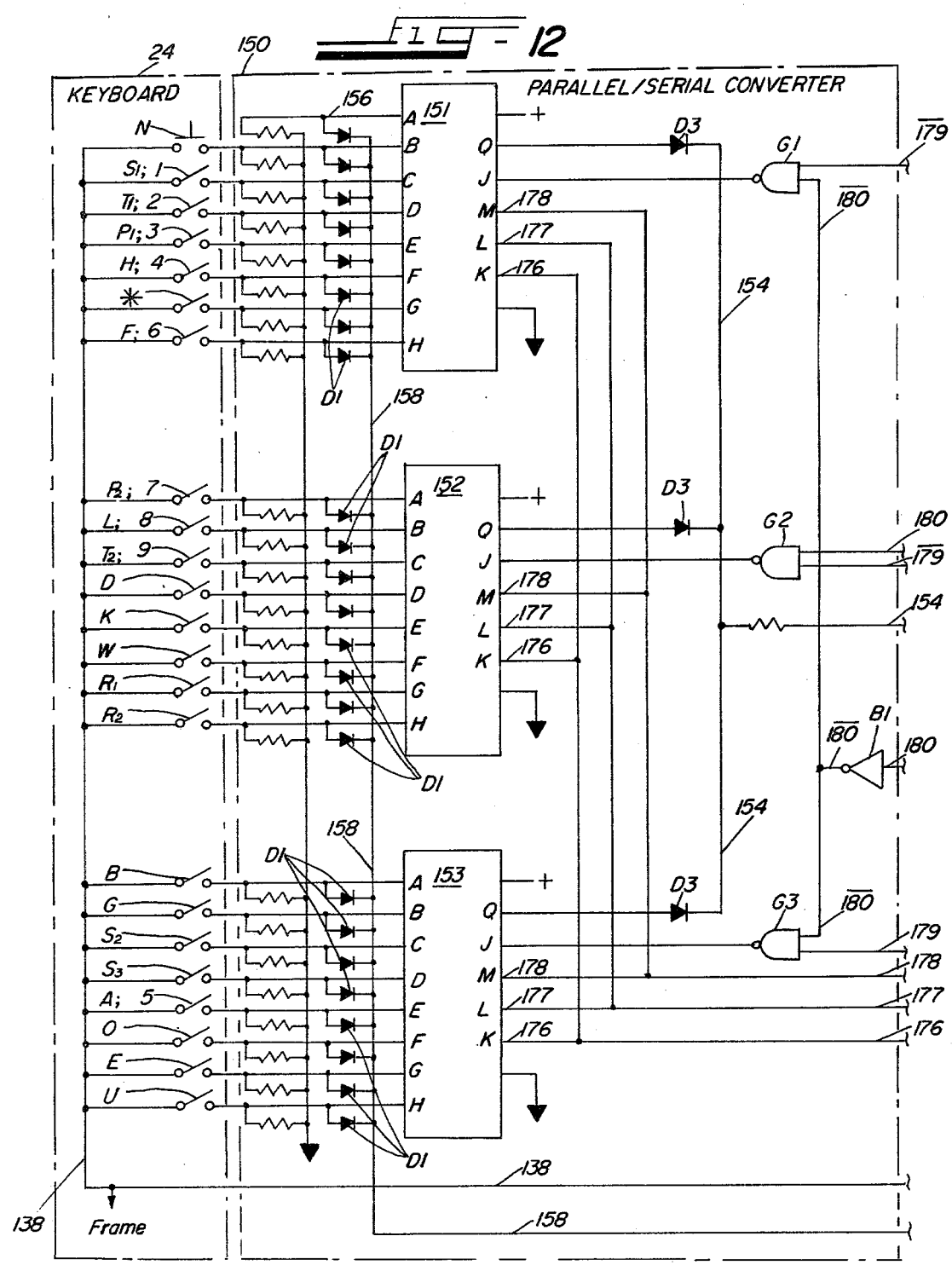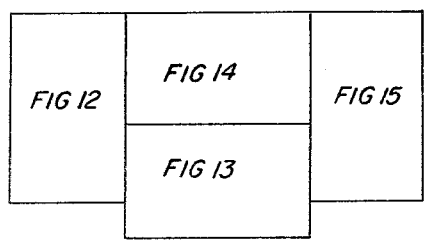

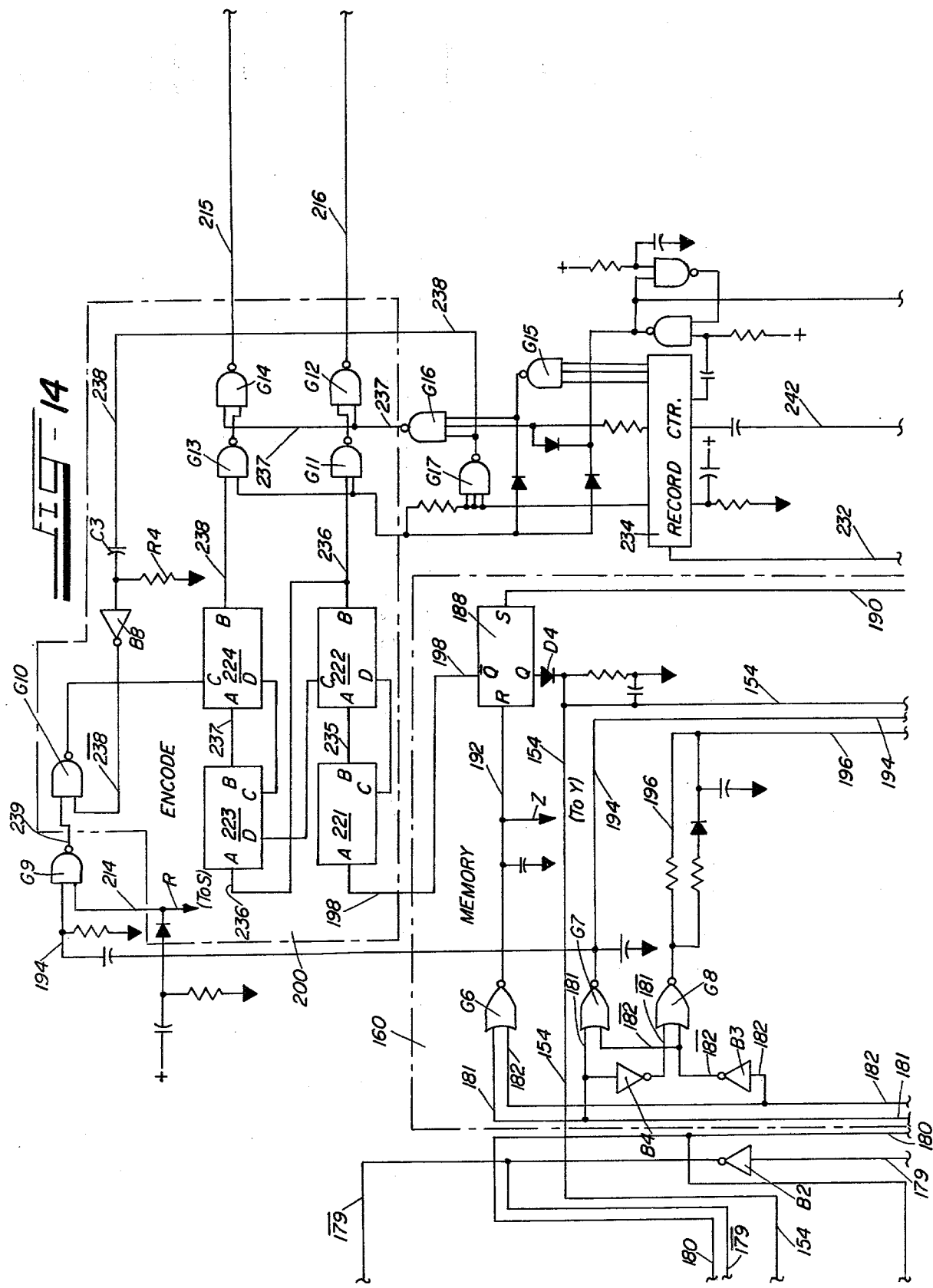

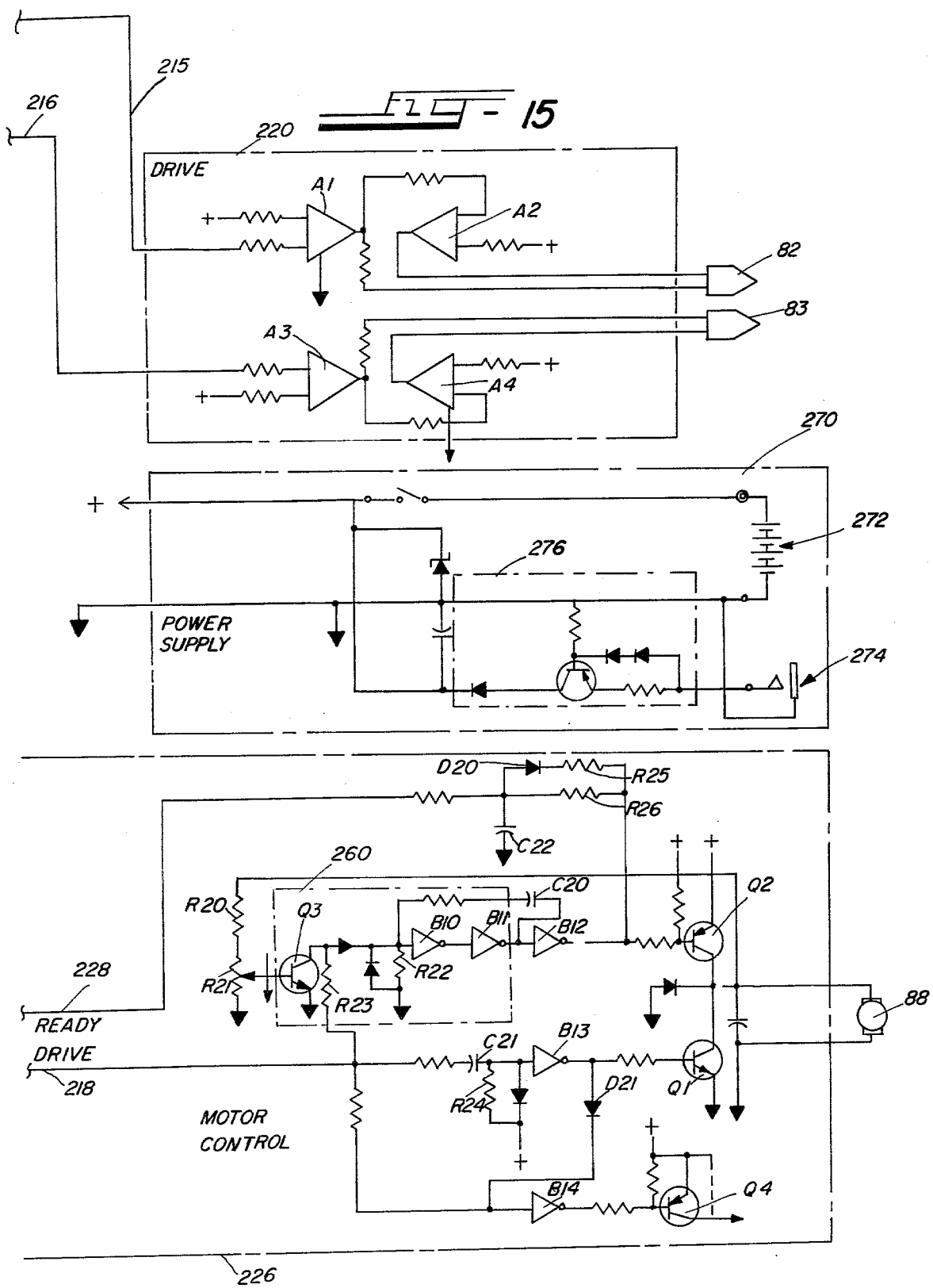

DIGITAL DATA RECORDER

BACKGROUND OF THE INVENTION

1. Field of the Invention

This invention is related to a digital data recorder and is particularly directed to a recorder for use in combination with a shorthand transcribing machine for providing a computer readable and translatable digital record of the phonetic words which are recorded by the shorthand machine.

2. Description of the Prior Art

Stenography is a widely used technique for recording the spoken word. The basic process includes two steps: (1) making a phonetic record of the speech being recorded, and (2) transcribing the phonetic record to a grammatical record such as, by way of example, an English language transcript. To insure reliability and efficiency in the recording process, and to simplify the transcribing process, shorthand machines are frequently employed to produce the phonetic record. Such machines are especially useful where the recording is made over a relatively long period of time, for example, in the courtroom or at a business meeting.

A widely used shorthand machine has a keyboard of twenty-two phonetically related symbols and characters which, to the skilled operator, provide the combinations necessary to record all English language words. The record produced by the machine is a paper tape on which the phonetic characters are printed. To record a word or part of a word, the operator strokes an appropriate combination of keys and the machine prints the characters simultaneously on an interval of the paper tape. The tape is advanced one interval before each combination is recorded.

For example, the paper tape record of the sentence, "You should be able to read these short words." would appear as follows on the paper tape:

|   |   |   |   |   |   |   |   |    |
|---|---|---|---|---|---|---|---|----|
|   |   |   |   | U |   |   |   |    |
| S | H |   |   | U |   |   |   | D  |
|   |   |   |   |   | B |   |   |    |
|   |   | A |   |   | BL|   |   |    |
| T |   |   | O |   |   |   |   |    |
|   |   | R |   | E |   |   |   | D  |
| T | H |   |   | E |   |   | S |    |
| S | H |   | O |   |   | R | T |    |
|   |   | W |   | O |   | R |   | DZ |

A general description of this type of machine is given in U.S. Pat. No. 2,319,273 entitled Stenographic Machine, issued to J. G. Sterling and assigned to the assignee of the present application.

The shorthand machine provides both reliability and economy in the recording process, but the transcribing process while improved through the use of a shorthand machine, remains time consuming. The operator must read back the paper tape containing the phonetic characters and make a corresponding grammatical record.

U.S. Pat. No. 3,557,927 entitled Stenographic Transcription System, issued to R. T. Wright, et al, and assigned to the assignee of the present application describes an improvement in the shorthand machine wherein the machine is modified to provide an electrical output in response to an operator's engaging an appropriate combination of keys. The electrical output provides input information to a computer, and the computer then performs the transcribing function by comparing the input characters from the shorthand machine with a grammatical reference, for producing a grammatical output. In its simplest form, the grammatical reference is a "dictionary" which relates all English language words to their phonetic or machine shorthand equivalents. The shorthand machine is coupled to a magnetic tape recorder which makes a record suitable for input to a computer. The recorder includes means for allocating fixed intervals along the magnetic tape to phonetic words and for allocating fixed subintervals to individual phonetic characters. The record is made in binary form wherein the binary bits in a predetermined subinterval indicate the presence or absence of the particular phonetic character associated with the subinterval. By using the intervals and subintervals, both recording and reading may be accomplished.

U.S. Pat. No. 3,832,733 entitled Manual Input Recordation of Data and Complement issued to B. Eldridge and assigned to Telewave Systems, Inc. also discloses a recording system for recording in digital form the phonetic phrases taken on a shorthand machine. In this system, each phonetic phrase comprises a combination of data and $\overline{\text{data}}$ (not data) signals, both of which are recorded, on separate tracks, on the magnetic tape.

By way of background, it should be noted that the following terms are used throughout this disclosure and are to be given their intended meaning as understood in the art:

The term "stroke" refers to the act of an operator engaging the keys of a shorthand machine with sufficient force to impress a symbol or character on the paper tape, and/or to produce an electrical output representing the symbol.

The terms "symbol" and/or "character" mean any representation of word construction including but not limited to letters of the alphabet. The term "combination" is intended to include single as well as multiple elements.

The term "phonetic words" means a particular combination of phonetic characters which may form all or part of the phonetics of a spoken word.

Also, it should be noted that the standard convention for the inverse or complement of an electrical signal is utilized, i.e., the inverse of A is $\overline{A}$ (not A). Signal leads carrying the inverse of a primary signal are also identified in this manner.

SUMMARY OF THE INVENTION

The present invention is directed to a digital data recorder which is an improvement over the recorders of the prior art and which is particularly well suited for use in recording the phonetic words taken by a shorthand machine for computerized translation and transcription.

The recorder is designed for recording digital data on a magnetic tape medium at high speed, utilizing maximum space on the magnetic tape for data storage. While the specific system disclosed in the preferred embodiment includes a shorthand machine for recording digital signals representing phonetic words taken by the shorthand machine, it should be understood that any source of digital data could be accepted and conditioned for recording by the present recorder with a minimum of modification.

The present invention maximizes use of electronic techniques while minimizing the need for mechanical components. The basic mechanism for the system is a D.C. motor that is belt coupled to a drive shaft for engaging a tape take-up spool in a tape cassette. The motor drives the take-up spool to advance the magnetic tape past magnetic recorder heads.

The data recorder operates on an incremental basis, i.e., it is always ready to accept data when available, and is at rest when no data is available. A high tape storage capacity is obtained by reducing the number of start/stop tape movements for each data group by employing electronic storage that accumulates and stores a predetermined number of data groups and then transfers the total of stored groups into one start/stop encoding cycle for producing the recording signals which are outputted at the recorder heads. Minimizing the number of start/stop movements also reduces the use of electric power. A noticeable reduction of audible noise is also experienced.

The recorder of the preferred embodiment has been specifically designed to accept the unique output which is characteristic of a shorthand machine keyboard and to record that data on the magnetic tape medium. The storage capacity of the magnetic tape is greater than a full reporter pad of paper of the type generally used with a shorthand machine, and will store approximately thirty thousand shorthand strokes entered at the machine by an operator.

The parallel data bits produced by the shorthand machine keyboard are serialized and stored at a memory. After a predetermined number of stroke-defining serial data bits are stored, the memory is unloaded for producing a phase encoded recording signal which is loaded onto the magnetic tape. Since the recording signal is phase encoded, each strokedefining series of data bits occupy the same interval on the tape, regardless of their identity. Thus, each stroke may be readily identified by a computer reader without dependency upon a reference signal. Production of phase encoded reference signals permits recording of each stroke on a single channel of the magnetic tape, whereby a plurality of tape channels may be utilized for data storage.

The control circuit for the tape drive motor for advancing the tape past the recorder heads is dependent upon the availability of phase encoded recording signals and is activated only when the recording signals are ready to be loaded on the tape. This maximizes the amount of space on the magnetic tape which is available for storage of useful data.

The recorder system includes stroke detect means which accurately respond to the introduction of a stroke at the keyboard of the machine by an operator. The stroke detect means compensate for the tendency of the operator to belatedly engage and/or prematurely release some of the keys which define a stroke.

The memory of the recorder is adapted for updating the data received throughout the duration of the stroke and insures that the stroke is accurately defined regardless of the operator's failure to simultaneously engage all of the keys utilized to define the particular stroke.

The memory is adapted to automatically store a plurality of the strokes entered at the keyboard of the shorthand machine, and then to sequentially transfer this data to encoding means for placing the data on the magnetic tape. New strokes can be accumulated in the memory while the transferred strokes are being loaded on the magnetic tape from the encoding means.

BRIEF DESCRIPTION OF THE DRAWINGS

FIG. 1 is a block diagram of the logic and control circuitry of a transcribing system embodying the features of the present invention.

FIG. 2 is a perspective view of a transcribing machine including the system illustrated in FIG. 1.

FIG. 3 is an exploded view of the components of the transcribing machine of FIG. 2.

FIG. 4 diagramatically illustrates a key, type bar and contact assembly in the normal position.

FIG. 5 diagramatically illustrates the key, type bar and contact assembly of FIG. 4 in the stroked position.

FIG. 6 is a fragmentary, longitudinal section of the recorder housing, and shows the drawer assembly for the magnetic tape cassette carriage in the retracted, closed position.

FIG. 7 is a view similar to FIG. 6 and shows the drawer assembly for the magnetic tape cassette carriage in the extended, opened position.

FIG. 8 is a fragmentary section view taken at line 8—8 of FIG. 6.

FIG. 9 is a fragmentary elevation view of the contact assembly and the main assembly of the transcribing machine illustrated in FIGS. 2 and 3.

FIG. 10 shows the underside of the contact assembly illustrated in FIG. 9.

FIG. 11 is a fragmentary section view taken at line 11—11 of FIG. 10, enlarged for clarity of detail and understanding.

FIGS. 12–15 comprise an elementary circuit diagram of the control circuitry illustrated in FIG. 1.

FIG. 16 illustrates the interconnecting relationship of FIGS. 12–15.

FIG. 17 is a diagramatic view of a magnetic tape carrying the phase recording signals produced by the present invention.

DESCRIPTION OF THE PREFERRED EMBODIMENT

I. The Machine Assembly

A. General

Figure 13:
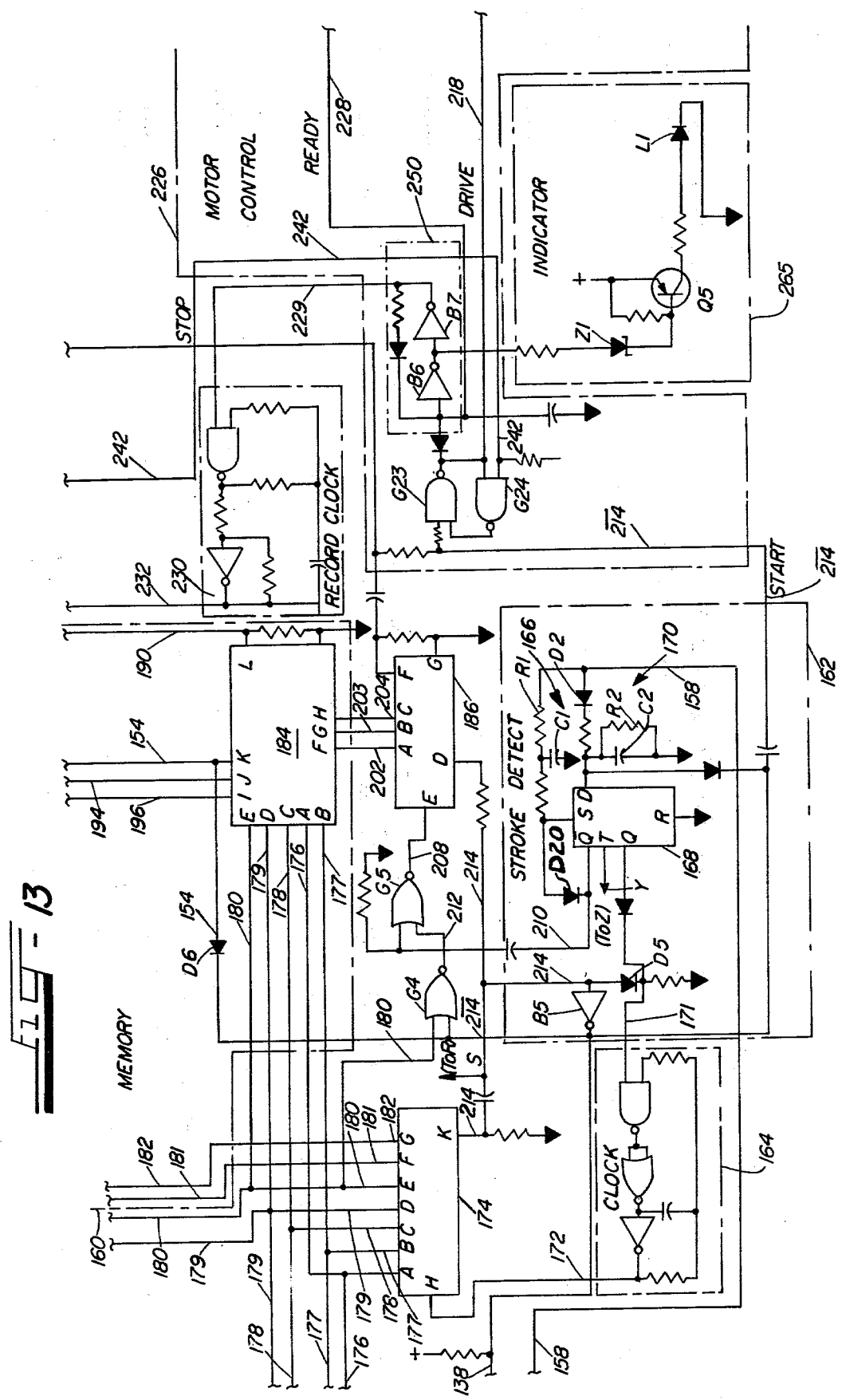

A shorthand transcribing machine incorporating the features of the present invention is illustrated in perspective in FIG. 2 and is designated, in general, by the reference numeral 20. FIG. 3 is an exploded view illustrating the interrelationship of the various components of the shorthand machine. The main assembly 22 and paper tray 26 are housed within a shell having base member 33, top member 34 and a removable access cover plate 35.

The main assembly 22 includes a keyboard 24 having a plurality of keys which, when stroked by an operator, produce a paper tape record of the words recorded. Each key has been identified by an alpha-numeric symbol which is reproduced at the paper tape when the key is stroked by the operator. The numeral bar "N", when stroked, shifts those keys representing both letter and numeral symbols from the letter symbol to the respective numeral symbol.

The paper tape (not shown) is carried in paper tray 26 which is mounted in the shell base member 33, beneath main assembly 22. The tape is transported over a rubber platen 28 positioned at the rear of the main assembly. A type bar 30 (FIGS. 4 and 5) is associated with each key and is advanced toward platen 28 when the particular key is stroked. The main assembly includes a ribbon advancing mechanism for feeding an inked ribbon (not shown) between the type bars and the platen. The paper tape is automatically advanced by rotation of platen 28 each time one or more of the keys 24 is stroked. The type bars associated with the stroked keys urge the inked ribbon into contact with the paper at platen 28 for impressing an inked symbol thereon.

The transcribing machine of the present invention is modified to produce an electrical output for identifying the keys stroked by an operator. In the preferred embodiment of the invention, the electrical output is coupled through a cable 38 to the logic and control circuitry mounted on board 40 which may be suitably mounted in the shell base member 33.

An output cable 42 transfers the electrical output produced by the logic and control circuitry to a tape recorder carried in housing 44. The housing 44 is mounted in depending relationship with shell base member 33 and includes a slidable drawer assembly 46 having a pivotal carriage 48 (FIGS. 6 and 7) adapted for receiving a magnetic recording tape cassette (not shown).

B. The Recorder Assembly

The drawer assembly 46 and pivotal carriage 48 are illustrated in detail in FIGS. 6–8. The drawer assembly is slidably received by recorder housing 44 and includes a bottom wall or plate 50 having an elongate channel 52 adapted for receiving guide post 54 which is mounted in upstanding relationship with bottom plate 56 of the recorder housing. The elongate channel 52 and post 54 limit the movement of drawer assembly 46 relative to housing 44. The pivotal carriage 48 is mounted on sidewalls 58 of the drawer assembly at pivot 60. Tab 66 is mounted in depending relationship with bottom plate 68 of the carriage and is disposed rearwardly of pivot 60. Upstanding tab 70 is mounted on bottom plate 50 of the drawer assembly and is disposed forwardly of pivot 60. Tension spring 72 has opposite ends secured in tabs 66 and 70, respectively, for upwardly urging the front end 74 of the carriage, as shown in FIG. 7.

When the drawer assembly is in the closed, retracted position of FIG. 6, top plate 64 of the recorder housing engages top edge 62 of the carriage for maintaining the carriage in an operating position. As the drawer assembly is advanced from the closed position (FIG. 6) to the open, extended position (FIG. 7), the top edge 62 of the carriage is moved beyond forward edge 76 of plate 64, and as tension spring 72 contracts, the carriage pivots upwardly and outwardly, as shown in FIGS. 3 and 7. When the carriage is disposed in this position a magnetic tape cassette may be inserted in the cassette-receptive channel 78 which is defined by spaced plates 68 and 69. A leaf spring 80 is mounted in channel 78 and adjacent to plate 69 for securely holding the magnetic tape cassette in the channel. The carriage includes a pair of recording heads 82, 83 (See FIGS. 1 and 15) in communication with channel 78 for engaging the magnetic tape of the cassette in the well known manner when the cassette is introduced into the channel.

Drawer assembly 46 includes plate 84 disposed in spaced relationship with bottom plate 50 (FIGS. 6 and 7). A pair of upstanding posts 85 and 86 are mounted in upstanding relationship with plate 84 and are adapted for receiving the sprocket gears of the take-up spools of the tape cassette when carriage 48 is disposed in the closed operating position of FIG. 6. In the preferred embodiment, post 86 is in driven relationship with motor 88 (see FIGS. 1 and 15) and when driven, rotates the take-up spool of the cassette for advancing the magnetic tape past recording heads 82, 83.

A leaf spring 90 is secured to side wall 58 of the drawer assembly and includes a detent button 92 which projects through a clearance hole provided in the side wall for engaging the side plate 94 of the recorder housing. A pair of spaced, detent-button-receptive holes 96 and 97 are provided in side plate 94 for selectively locking the drawer assembly 46 in the open and closed positions, respectively. Drawer pull 98 is secured to front wall 100 of the drawer assembly.

The preferred embodiment of the recorder housing includes a hinged rear plate 102 for providing access to the interior of the housing. Where desired, the housing may include a battery or storage cell receptive cavity, whereby the power supply for energizing the logic and control circuitry of FIGS. 1 and 12–15 may be self-contained as an integral part of the system.

C. The Contact, Key and Type Bar Assembly

The electrical output generated by stroking the keys of keyboard 24 is provided by mounting contact assembly 104 above the type bars 30 of main assembly 22, as shown in FIGS. 4, 5 and 9–11. The numeral bar N is connected to an electrical switch (not shown), similar to that disclosed in the aforementioned U.S. Pat. No. 3,557,927. Each of the twenty-two keys of the keyboard have an independent contact associated therewith. Each contact, when closed, provides an independent electrical signal which is inputted into the logic and control circuitry via cable 38.

As shown in FIG. 9, the base 105 of the contact assembly is mounted to frame 108 of the main assembly directly above type bars 30. An elongate, non-conducting spacer 110 is mounted on the underside of base member 105 by suitable means such as, by way of example, mounting screws 111.

A plurality of flexible connectors 114, one for each contact 112, are carried in channel 116 of base 105 and collectively define cable 38 for transferring the twenty-two independent electrical signals from the contacts to the logic and control circuitry. Each connector 114 passes through channel 116 and through an insulation filled aperture 118 in spacer 110 to the associated contact 112. The connector is secured in electrical continuity with contact 112 by suitable means such as solder 120 or the like.

The type bar, key and contact assembly of the preferred embodiment is illustrated in FIGS. 4 and 5. A typical key "$S_1;1$" of keyboard 24 is mounted on one end of the elongate key lever 122 which is rotatably supported by the frame of the main assembly at pivot 124. The opposite end 126 of the key lever supports one end 128 of the bell crank 127. The bell crank is pivotally mounted on the frame of the main assembly at 130 and is pivotally coupled to type bar 30 at 132. The bell crank terminates at hook 134 which is adapted for receiving one end of type-bar-return tension spring 136. The opposite end of the spring is secured to the frame of the main assembly at tab 139.

The type bar, key and contact assembly for key "$S_1;1$" is illustrated in the normal position in FIG. 4 and in the "stroked" position in FIG. 5. When the key is stroked, key lever 122 rotates the bell crank about pivot 130 and advances hook 134 and type bar 30 toward platen 28. When the key is released, tension spring 136 returns the type bar, bell crank and key lever to the normal position of FIG. 4.

The bell crank is connected to one side of the electrical circuit via connector 138 and frame 108. Contact 112 is in communication with the other side of the circuit via one of the connectors 114 of cable 38. When the key is in the normal position of FIG. 4, an open circuit condition exists between connectors 114 and 138. Once the key is stroked as shown in FIG. 5, hook 134 of the bell crank is advanced into positive engagement with contact 112 for closing the circuit and for producing an electrical signal which is transferred to the logic and control circuit.

In the preferred embodiment, a non-conducting or insulated adjustment screw 140 is associated with each of the contacts 112 for adjusting the spacing between the contact and the end of hook of 134. An insulated or nonconducting pad 142 is mounted in base 105 to preclude electrical continuity between base 105 and the free end 144 of each contact 112.

II. The Logic And Control Circuit

A. General

The logic and control circuit for receiving the electrical output signals produced by closing the contacts associated with keyboard 24, and for conditioning the signals for recording on a magnetic tape medium, is shown generally in the block diagram of FIG. 1. A detailed elementary diagram of the preferred embodiment is illustrated in FIGS. 12-15.

Each time an operator enters a stroke at the keyboard 24, any combination of twenty-two key contacts and the numeral bar switch may be closed. Each contact and/or switch closed produces an electrical signal which, for the present example, may be assumed to represent a binary "1". Those which are not closed and therefore, represent keys which have not been engaged for the particular stroke, produce no electrical output signals. Each open contact condition may be interpreted as a binary "0".

As soon as the first key of the stroke is engaged by the operator, a signal is produced on lead 158 and is introduced into stroke detect circuit 162. This signal remains present until the last key of the stroke is released.

The signal duration defines that period of time when one stroke is being entered at the keyboard.

Upon recognition of a stroke, stroke detect circuit 162 produces a signal on lead 171 for activating clock 164. In response, clock 164 generates an output on lead 172 which is the timing and control signal for the memory/encode loading phase. In response, counter 174 produces a binary output sequence at leads 176-182 for controlling the operation of the parallel/serial converter 150. The counter 174, in combination with gate G4 and counter 186, also controls the subroutine cycle of memory 160 and the selection of the bit storage addresses within the memory.

Clock 164 also controls the loading of encode circuit 200 through various conditioning circuits. Thus, all of the memory/encode loading circuitry responds to a single source signal which is initiated and terminated in response to the recognition of a stroke by stroke detect circuit 162. This permits accurate synchronization of the various subroutines necessary to properly condition the electrical signals produced at keyboard 24 for temporary storage in memory 160 and transfer to encode circuit 200.

The combination of binary "0's" and "1's" which comprise the twenty-three parallel signals defining a single stroke are inputted into convertor 150. In response, the convertor produces a serial output signal on lead 154 which comprises twenty-three data bits defining the combination of keys engaged during the stroke.

The data bits are sequentially introduced into memory 160 which is capable of storing a limited, predetermined number of strokes each comprising a finite number of data bits. Each data bit is "written" or stored at a dedicated bit address within the memory.

The total available bit addresses are divided into a plurality of groups, each of which includes enough bit addresses to store one complete stroke. The group is selected by the sequence output of counter 186, whereas the bit address within each group is selected by the sequence output of counter 174. A single group is selected for as long as a single stroke is recognized by stroke detect circuit 162. The bit addresses within the selected group are then sequentially filled with the data bits produced by the convertor at lead 154. The convertor sequentially scans the series inputs produced by the contacts at keyboard 24 for the duration of the stroke.

The memory is cycled through a four-step subroutine each time a new data bit is introduced into or offered to memory 160. This permits the memory to accurately define a stroke even through the operator belatedly engages or prematurely releases some of the keys which define the stroke. The four-step subroutine operates to first clear a one bit buffer store in the memory, then to "read" the data bit previously stored on the selected bit address and store it in the buffer store. The memory 160 then accepts the offered data bit from converter 150. If a binary "1" is present in the buffer store and/or is offered by the convertor, it is "written" as a binary "1" at the selected bit address. Otherwise, a binary "0" is written. After this, the next bit address in sequence is selected and the subroutine is repeated for the next data bit in sequence.

When all of the group addresses have been filled, counter 186 produces a signal on lead 214 which is inputted to gates G4 and G9, motor control circuit 226, clock 164 and keyboard 24. This inhibits the recognition of a new stroke by stroke detect circuit 162. The memory circuit 160 is shifted from the bit receiving and loading phase to a bit unloading phase for sequentially unloading each of the stored data bits from the memory into encode circuit 200 via lead 198.

Clock 164 is energized by the signal on lead 214 and activates counters 174 and 186, whereby the ordered transmission of data bits from the memory to the encode circuit is controlled.

The data bits progress through a plurality of shift registers in the encode circuit until all bits have been unloaded from the memory. The encode circuit separates the stroke defining data bits into two equal groups of strokes which are then processed to produce a pair of simultaneous phase encoded recording signals. The production of two simultaneous phase recording signals doubles the data loading capacity of the tape medium during a single pass by permitting strokes to be simultaneously stored on two channels.

The motor control circuit 226 is energized to bring motor 88 up to speed for advancing a magnetic tape past recording heads 82, 83. Then, record clock 230 and record counter 234 are energized to control the ordered progression of the simultaneous phase recording signals from the encode circuit to the recorder head drive circuit 220 where the signals are conditioned for output at recorder heads 82, 83.

After all of the data bits have progressed through the encode and drive circuits and have been recorded on a magnetic tape medium, the record counter 234 signals the motor control to stop the motor. Motor control 226 is designed to control the motor with optimum acceleration and deceleration so that minimum blank space appears on the magnetic tape medium between group of strokes.

A magnetic tape loaded with the phase recording signals produced by the present invention is diagramatically illustrated in FIG. 17. As shown in enlarged portion A thereof, each stroke comprises a combination of twenty-three data bits representing binary "0's" and "1's" which may be interpreted by a computer to provide an English language translation. Each stroke occupies a specific stroke interval P on the tape followed by a predetermined gap or blank space Q which represents an end-of-stroke interval. The end-of-stroke interval provides a definite interruption between strokes and is readily identifiable by a computer when reading the tape. This insures accurate identification of the independent strokes.

As stated, each phase recording signal comprises a finite number of strokes which have been stored in the bit addresses of memory 160. In the present example, the memory capacity is eight strokes. The eight strokes are divided into two groups of four, and each group is simultaneously recorded on the tape at recording heads, 82, 83. This permits recording data bits on two channels I and II of the tape. In the present example, strokes "1-4" are recorded on channel I while strokes "5-8" are being simultaneously recorded on channel II.

The four strokes defining a phase recording signal occupy a phase signal interval R on the tape. During movement of this interval past the recorder heads, the motor is at recording speed and the only intervals between data bits are the predetermined end-of-stroke intervals Q.

At the end of a phase signal, the motor is signaled to stop and the braking time produces a blank space on the tape. Additional blank space occurs when the motor is brought up to speed for advancing the tape past the recorder heads to record the next phase recording signal. This combined gap is identified as interval S. The present system is designed to minimize interval S.

After the memory has been unloaded the signal on lead 214 is terminated and the next stroke is recognized by stroke detect circuit 162. At this point, the memory shifts back to a bit receiving and loading phase and the memory load cycle is repeated.

A detailed description of the logic and control circuit broadly disclosed in the block diagram of FIG. 1 follows, with particular reference to FIGS. 12-15.

B. The Parallel/Serial Convertor

The parallel/serial convertor 150 (FIG. 12) comprises three multiplexers 151, 152 and 153, each of which is adapted for simultaneously receiving eight parallel input signals. In the preferred embodiment, National Semiconductor 74C151 multiplexer units have been used with uniformly satisfactory results.

Each multiplexer converts the corresponding eight parallel input signals into a series of eight sequential binary bits which are serially introduced into the memory unit 160 via lead 154. The operation of the multiplexers is controlled by stroke detect circuit 162 and clock 164 in combination with binary sequence counter 174 (FIG. 13).

The clocking pulse on lead 172 is introduced into the binary counter at terminal H. The binary counter of the preferred embodiment is adapted for producing a binary sequence at terminals A-G in response to the clock pulses. In practice, an RCA CD4024 A counter unit has been utilized with uniformly satisfactory results. Terminals A, B and C are the third, fourth and fifth sequential output terminals of the counter. These terminals are connected directly to terminals K, L and M, respectively, of the multiplexers 151, 152 and 153 via leads 176, 177 and 178, for activating each of the multiplexers to sequentially scan the multiplexer input terminals A-H.

Since the multiplexers are connected in parallel with one another, it is necessary to sequentially activate the multiplexers for insuring that only one output signal is present on lead 154 at any given instant. This is provided by connecting "NAND" gates G1, G2 and G3 and "INVERTING" buffers B1 and B2 to the first and second binary sequence terminals D and E of counter 174 via leads 179 and 180, respectively. These gates and buffers decode the binary sequence on lines 179 and 180 to a count of four, with only three of the four counts being used in the preferred embodiment. The "one out of four" output of gates G1, G2 and G3 are connected to terminal J of the respective multiplexer 151-153. Each multiplexer is energized to produce an output signal at terminal Q when terminal J of the particular multiplexer is energized.

Output terminal Q of each multiplexer is in communication with signal lead 154 via one of a plurality of isolating diodes D3. When the source signal is present at particular input terminal A-H of the multiplexers, this signal is serially reproduced as a single bit on lead 154 for introduction into memory unit 160.

Since only three of the four counts provided by gates G1-G3 and buffers B1, B2 are utilized, an additional multiplexer could be added to the parallel/serial convertor without altering the gating circuitry. This would increase the output capability of the present circuit design to handle thirty-two outputs. It should, of course, be understood that any number of outputs can be handled by modifying the sequencing circuitry. Therefore, while the preferred embodiment is adapted for responding to twenty-three keyboard signals, the present invention is not so limited.

C. The Stroke Detect Circuit

Design of the present system is complicated by the practical impossibility of even the most skilled operator to simultaneously engage and release all of the keys during a single stroke. Typically, an operator will engage and release keyboard keys at different times during the stroke, whereby the combination of keys representing a stroke is not identical throughout the entire stroke. The stroke detect circuit 162 is adapted for responding to this inconsistency by defining a single stroke as beginning after the first key of the stroke is engaged by the operator and by not recognizing the end of the stroke until the last key of the stroke has been released.

Signal lead 158 is connected to the output side of each contact through a plurality of gating diodes D1 and is introduced into the stroke detect circuit at diode D2 and resistor R1. The source signal is present on lead 158 whenever at least one key of the keyboard is engaged by the operator to close a contact and initiate a stroke.

The signal remains present until the very last key of the stroke is subsequently released. The signal on lead 158 is utilized to accurately define stroke duration.

Also, the stroke detect circuit must ignore the characteristic of an electrical switch or contact to vacillate between open and closed conditions when a change in condition is initiated. This characteristic is known as "keyboard bounce" or "contact bounce" in the field of the present invention and is of critical significance when the first key of a stroke is initially engaged or the last key of the stroke is finally released by the operator. If this characteristic is not ignored by the logic of the system, each opening and closing of the subject key contact will be read as a separate and complete stroke.

The time constants "T1" of RC network 166 (R1 and C1) and "T2" of RC network 170 (R2 and C2) are utilized to compensate for keyboard bounce by utilizing the signal present on lead 158 to charge and discharge capacitors C1 and C2 to their respective threshold levels at a slow enough rate to insure that any keyboard bounce by the operator is over before a stroke is detected. Bistable multivibrator or flip-flop 168 is set "ON" to indicate a "start of stroke" by activating the "SET" terminal S when capacitor C1 is charged through resistor R1. Capacitor C2 is allowed to charge faster than capacitor C1. After the flip-flop is SET, an output is produced at terminal Q in response to the signal level inputted at terminal D. In the preferred embodiment, the adverse effects of "keyboard bounce" have been effectively eliminated when the time constants "T1" and "T2" are in the neighborhood of 8 milliseconds.

Once a stroke is initiated and "keyboard bounce" is overcome the stroke detect circuit produces an output signal at terminal Q of flip-flop 168. This signal is transmitted via lead 171 to clock 164 for initiating clocking pulses on 172 which energizes the counter 174. Clock 164 is thus energized for as long as a stroke is detected by circuit 162.

The end-of-stroke feature of the stroke detect circuit is dependent upon other components of the circuitry illustrated in FIGS. 12-15, and this features is described following the description of the associated circuitry.

D. The Memory Circuit

The memory circuit receives and stores the signals present on lead 154 when the clock has been activated in response to the presence of a stroke as detected by stroke detect circuit 162. The memory cycle is controlled by the binary sequence output of terminals A-G of counter 174 whenever clock 164 is activated. The memory load cycle is activated by the stroke detect circuit 162 through clock 164 and counters 174 and 186 in combination with "NAND" gates G4, G5, G6, G7 and G8. A buffer store is defined by the flip-flop circuit 188 and compensates for the operator's characteristic of engaging and releasing keys at different times during a single stroke.

Each independent signal on lead 154 defines one "bit" of a total stroke. In the preferred embodiment, twenty-three bits are required to define one stroke. A bit will be assumed to be a binary "1" if the particular key of keyboard 24 is engaged and a binary "0" if the subject key is not engaged during a particular stroke. Each bit of a predetermined number of strokes sequentially entered at keyboard 24 is stored or "written" at a dedicated bit address in the memory. After the predetermined number of strokes have been received and stored, the strokes are sequentially unloaded into encode circuit 200, bit-by-bit, for recording on magnetic tape at heads 82, 83. This clears the memory for receipt of the next predetermined number of stroke-defining-bits sequentially entered at the keyboard.

The various bit addresses in the memory are contained in a memory bank defined by the circuit element 184. One example of an acceptable memory bank is an RCA CD 4061A memory unit. The memory bank includes input terminal K for receiving the serial stroke signal present on lead 154. Terminals A-H receive binary sequence signals for defining the particular bit address, and terminals I and J are control terminals. The output terminal L "reads" the information "written" or stored at each address.

In the preferred embodiment, memory bank 184 is adapted for receiving and storing eight complete strokes, each of which comprise twenty-three bits of information. Since the memory bank, and the circuitry in general, operate in a binary world, memory bank 184 actually has storage capacity for eight times thirty-two (the closest binary equivalent to twenty-three), or 256 bits. Thus 256 unique addresses are defined by address terminals A-H of the memory bank.

The logic and control circuitry of the preferred embodiment is designed with this increased capacity in mind. As stated, only three of the four counts provided by gates G1-G3 and buffers B1 and B2 are utilized to control the multiplexers of the parallel/serial convertor 150. An additional multiplexer could be added for increasing the output capability to thirty-two data bits. Thus, eight strokes, each defined by the thirty-two bits, would provide 256 bits for filling memory bank 184. Since only twenty-three bits are required to define a stroke, the present circuit is operated by counting through all thirty-two counts required to complete a binary sequence, with nine of the counts being ignored.

It should, of course, be understood that the ignored counts may readily be utilized to provide additional input information such as, by way of example, identification of the operator, where such information is desired.

It is important to understand the functional features of memory bank 184 in order to fully appreciate the operation of memory circuit 160. The 256 bit addresses are subdivided into eight groups of thirty-two, wherein one complete stroke is stored or "written" in each group. The binary sequence at terminals F, G and H of the memory bank define which of the eight groups of bit addresses is being addressed for a given stroke. The binary sequence at terminals A-E of the memory bank determine which of the thirty-two bit addresses of a group is selected, on a one-to-one relationship with the sequence scan of the multiplexer input terminals.

The selected group and/or bit address can be changed only when terminal I of the memory bank is energized. Once a stroke is entered at keyboard 24 and a group address is selected at terminals F, G and H of the memory bank, the counter 174 controls the sequential scanning cycle of the multiplexer input terminals A-H. The signal present on each input is then introduced at terminal K of the memory bank via lead 154.

Each multiplexer input terminal has a single dedicated bit address within the group selected. This is assured by utilizing the same binary sequence to select the bit address as is used to control the scanning sequence of the parallel/serial convertor.

The memory cycle is initiated as soon as clock 164 is energized. Initially, this occurs when the operator engages at least one key during a stroke, thereby producing a signal on lead 158. Counter 174 produces a binary sequence output which is repeated every four counts at terminals F and G. This binary sequence, in combination with "INVERTER" buffers B3 and B4, operates "NAND" gates G6, G7 and G8 to control the memory subroutine. Using the binary symbols "0" and "1", the memory cycle is summarized in table I:

TABLE I

| SUBROUTINE STEP & COUNT | COUNTER 174 TERMINAL | | GATE OUTPUT | | | MEMORY FUNCTION |
| --- | --- | --- | --- | --- | --- | --- |
| | G | F | G6 | G7 | G8 | |
| 1 (RESET) | 0 | 0 | 1 | 0 | 0 | Reset Buffer Store 188 |
| 2 (READ) | 0 | 1 | 0 | 0 | 0 | Load Store 188 from Bank 184 |
| 3 (WRITE) | 1 | 0 | 0 | 1 | 0 | Write stroke in Bank 184 |
| 4 (ADDRESS) | 1 | 1 | 0 | 0 | 1 | Change Bank 184 address |

After each set of four counts, the binary sequence at terminals A-E is updated by a count of one to select a new bit address. During the four step counting sequence which occurs between bit address changes, the complete subroutine in Table I is performed.

The first step of the subroutine occurs when gate G6 produces an output signal at line 192 for resetting buffer store 188 by energizing terminal R. On the next count, the signal on line 192 is dropped, and the second step is activated. During this step, the information bit stored or "written" at the selected bit address is "read" and outputted at terminal L of memory bank 184 and is transmitted to terminal S of buffer store 188. If a "1" bit is present at terminal S, this bit is then outputted at terminal Q and reentered on lead 154 through diode gate D4.

This is important because of the tendency of an operator to prematurely release some of the keys during a stroke. Buffer store 188 feeds the subject bit back into memory bank 184 from any key previously depressed and released while other keys are holding the operation of the system in a stroke store condition.

On the next count, gate G7 produces an output signal which is transmitted via lead 194 to terminal J of memory bank 184. This shifts the memory bank from a "reading" mode to a "writing" mode whereby the last information bit entered at terminal K via lead 154 from converter 150 and/or from terminal Q of store 188 is written into the selected bit address.

On the last count, gate G8 produces an output signal which is transmitted to terminal I of the memory bank via lead 196. This activates the memory bank so that change of address may occur. Then binary output sequence of terminals A-E of counter 174 is advanced by a count of one, advancing the bit address of memory bank 184 and the scanning cycle of the parallel/serial convertor. The four step subroutine and memory bit address advance are then cycled until the next "end-of-stroke" is detected by stroke detect circuit 162.

The group address is determined by the binary sequence produced at terminals A-C of the binary counter 186 and entered at terminals F-H of the memory bank. Binary counter 186 is advanced by a count of one whenever a signal is present on lead 208 from gate G5. This occurs upon completion of a stroke by the operator as detected by stroke detect circuit 162.

When the last key is released, the signal present at lead 158 is dropped and terminal D of flip-flop 168 is allowed to slowly drop. When terminal D has dropped to its threshold level, the next positive going pulse on terminal T flips the flip-flop 168 back to its "end-of-stroke" state. It should be noted that capacitor C1 has been kept discharged during this time by diode D20 connected to terminal $\overline{Q}$ precluding C1 from introducing a set signal to terminal S. Shifting the flip-flop output signal from terminal Q to terminal $\overline{Q}$ de-energizes clock 164. At this point, one stroke has been completely and accurately stored at the designated addresses of memory bank 184.

Stroking by the operator is a slow, mechanical process compared to the speed of operation of the logic circuitry. Therefore, the initial memory timing signal present on lead 192 during the first step of the memory subroutine is also used to shift the Q terminal output of flip-flop 168 when the memory has reached the end of a memory load sequence by coupling lead Z (FIG. 14) to terminal T of flip-flop 168 via lead Y (FIG. 13). In this manner a relatively slow changing signal resulting from the contact bounce timing circuits is synchronized with the relatively high speed operating cycle controlled by clock 164.

The signal on lead 210 is transmitted to gate G5 which produces an output on lead 208 for advancing counter 186 by a count of one. This selects the next group address of memory bank 184. When the next stroke is entered at keyboard 24, clock 164 is again activated and initiates the scan and load memory cycle for the bit addresses of the new stroke.

The address selection, scanning of the convertor and the loading of the memory are continued until all 256 bit addresses, representing eight strokes, are filled.

After eight strokes have been loaded in memory bank 184, the eight strokes are unloaded into encode circuit 200 via lead 198. All 256 bit addresses of the memory bank are cleared before the next stroke is received by the memory. This occurs when the eight strokes stored in memory bank 184 are being unloaded and transferred to encoder 200 by preventing the feedback signal from store 188 reaching memory bank 184 due to diode D6. This clearing signal is generated by counter 186 terminal D on lead 214 and is conditioned by inverter buffer B5.

The clearing signal is produced on lead 214 whenever the memory is in the unloading mode and is introduced into clock 164 through diode D5 and energizes counter 174. This signal is also connected to the reset input of counter 174, thereby setting the counter to its first count. The counter is then advanced through each of the 256 bit addresses of memory bank 184, sequentially unloading the memory into encode circuit 200. The eight group addresses are sequenced by the output produced at terminal E of counter 174 and are inputted to gate G4 for producing a clocking signal to counter 186 via gate G5. The thirty-two bit addresses for each group are selected by the binary sequence outputs of terminals A-E of counter 174.

E. The Encode Circuit

Encode circuit 200 receives the eight stored strokes sequentially unloaded from memory 160, and separates the eight strokes into two groups of four strokes which are processed to produce phase recording signals. These signals are outputted on leads 215 and 216 for controlling a pair of parallel drivers in drive circuit 200 which simultaneously send the strokes onto a pair of magnetic recorder heads 82 and 83 for simultaneously recording the strokes on two channels of a magnetic tape, as shown in FIG. 17.

The encode circuit 200 comprises four shift registers 221–224 connected in series with one another and controlled by a phase encoding circuit defined by "NAND" gates G11, G12, G13 and G14. Shift registers 221 and 222 are connected to first place encoder comprising "NAND" gates G11 and G12, whereas shift register 223 and 224 are connected to with a second phase encoder comprising "NAND" gates G13 and G14. Four of the strokes are sequentially unloaded from shift registers 221 and 222 into gate G11 of the first phase encoder while the remaining four strokes are simultaneously unloaded from shift registers 223 and 224 into gate G13 of the second phase encoder.

The eight strokes unloaded from memory bank 184 are sequentially introduced bit-by-bit into shift register 221 at terminal A via lead 198. In the preferred embodiment, each shift register is adapted for receiving and holding sixty-four data bits. Therefore, after the first sixty-four bits (defining two strokes) have been introduced into shift register 221, the sixty-fifth bit forces the first bit out at terminal B, and this bit is entered at terminal A of register 222. This shifting sequence continues until all four shift registers are filled. At this point, two of the eight strokes are located at each shift register.

The "SHIFT" clocking signal for shift registers 221–224 is generated at the output of gate G7 and appears on signal line 194. This output is initiated at the end of the memory READ cycle (See Table 1) and assures that a bit is in storage in register 188 and waiting to be transferred into shift register 221. Each clock signal transfers the bit stored at 188 to the A input of shift register 221 and also shifts all the bits stored in the shift registers. The SHIFT clocking signal is gated by G9 which is controlled by the D terminal output of binary counter 186, lead 214, see lead R (FIG. 14) and lead S (FIG. 13). This output is high only during the shift register loading, i.e. memory unloading, phase of operation. In this manner, the "reading" of memory bank 184 into the shift registers 221–224 is locked together with the same clock 164, and precludes loss of synchronization between these circuits.

When all the data bits have been transferred from memory bank 184 into shift registers 221–224, signal lead $\overline{214}$ from buffer B5 sends a signal to gate G23, which acts with gate G24 to define a flip-flop for activating the RECORD cycle. The output from gate G23 is connected by lead 218 to the motor control circuit 226 which in turn energizes the D.C. motor 88. When motor 88 reaches its operating speed, a signal is sent on lead 228 to flip-flop 250 (buffers B6, B7) which then activates the record clock multivibrator 230. The record clock output signal on lead 232 is fed into binary record counter 234 for controlling the generation of the phase encoded recording signals, the clock pulses for shifting the shift registers, and for stopping the record cycle when all the stroke bits have been recorded.

The record phase encoding circuits comprise gates G11–G17 and produce the self-clocking phase recording signals to be transferred onto the magnetic tape as binary "0's" and "1's". The phase recording signals are produced as output signals of gates G12 and G14 and are inputted to drive circuit 220 via leads 215 and 216, respectively. In the preferred embodiment, each data bit phase recording signal comprises the four counts generated by the first two stages of binary record counter 234 and gates G11–G17.

The data bit at the output terminal B of shift register 222 appears on lead 236, whereas the data bit at the output terminal B of shift register 224 appears on lead 238. These leads are connected to gates G11 and G13, respectively. This determines whether a binary "1" or binary "0" is to be recorded on the magnetic tape. For instance, a "1" bit at the output of shift register 222 is represented as a low signal, causing gate G11 to produce the "1" record signal. Likewise, an "0" bit at the output of shift register 222 is represented as a high signal, causing gate G11 to produce the "0" record signal. Since a binary "1" output represents a key which has been engaged and a binary "0" output represents a key which has not been engaged during a stroke, it will be seen that an output signal is produced for every key of keyboard 24 whether or not a particular key is engaged. This permits phase encoding of the stroke defining record signals.

After a record signal has been completed, and the next bit is to be recorded, a positive going signal is generated at the output of gate G17. This signal is differentiated by the RC network R4C3, inverted by buffer B8 and is then fed into gate G10. The output of gate G10 is a pulse that is connected to shift register 224, which in turn is fed to shift registers 223, 222 and 221, causing the shifting of one bit throughout shift registers. In this manner, each succeeding data bit appears at gates G11, G13 and defines the control bit for generating the phase encoded record signal.

It should be noted that motor 88 is at operating speed, and that the magnetic tape is moving past the magnetic heads 82, 83 at this time. The record clock and magnetic tape speed are optimized to maintain a satisfactory bit "packing" density and recording transfer rate on the magnetic tape. It should also be noted that strokes "1", "2", "3" and "4" are sequentially introduced onto lead 215 as strokes "5", "6" "7" and "8" are simultaneously introduced at lead 216, on a bit-by-bit basis, producing a loaded tape as shown diagramatically in FIG. 17.

The shifting of bits from the shift registers 221–224 is counted by record counter 234. When a count of twenty-eight is reached, the output of gate G15 goes low, which forces gates G11 thru G14 to produce continuous low outputs at gates G12 and G14 independent of bit signals from the shift registers. This condition remains for counts 28 thru 32, and produces a gap Q on the magnetic tape. This gap provides an easy method of recognizing the end of a stroke when the magnetic tape is to be played back. This process is repeated for each of the four strokes. When the last bit of the eight strokes has been recorded on the magnetic tape, the ninth stage of binary counter 234 produces a signal which is coupled to gate G24 via lead 242 for resetting flip-flop 250. This stops the record clock 230 and motor control 226. The motor control 226 removes power from the drive motor 88, and momentarily turns on transistor Q1 to cause rapid deceleration of motor 88. The magnetic tape record cycle is now complete. It is repeated when the next eight strokes are available at memory bank 184.

It should, of course, be understood that the data bit signals produced by the encode circuit are conditioned before being outputted at heads 82, 83. As the first four strokes are produced, bit-by-bit, on lead 215, they are introduced into drive circuit 220 and conditioned by amplifiers A1 and A2 for recorder head 82. As the last four strokes are simultaneously produced, bit-by-bit, on lead 216, they are likewise conditioned by amplifiers A3 and A4 for recorder head 83.

F. The Motor Control Circuit

The motor control circuit 226 is designed to rapidly bring a D.C. motor up to a desired speed, accurately maintain that speed for as long as needed, and then rapidly stop the motor. These capabilities must be performed independently of motor load and source voltage changes since the motor speed determines the speed at which the magnetic tape is advanced past the recorder heads, which in turn determines the accuracy with which the data bits are recorded on magnetic tape.

A multifunction oscillator 260 comprising buffers B10, B11 and transistor Q3 provides the basis for the motor control circuit. The oscillator 260 functions as either a free-running multivibrator or as a one-shot multivibrator. The mode of operation is dependent upon the back E.M.F. generated by D.C. motor 88 when it is unpowered and is coasting.

The motor control circuit is activated when a START signal is produced on lead $\overline{214}$ in response to the output sequence signal at terminal D of counter 186. This signal is inputted into a flip-flop circuit comprising gates G23 and G24 and produces a high, DRIVE signal on lead 218. Since the D.C. motor 88 is at rest, there is no voltage across the motor to be fed back to drive transistor Q3. The DRIVE signal is inverted through each of the buffers B10, B11 and B12. Buffer B12 turns ON transistor Q2 for supplying full source voltage to motor 88 and series resistors R20 and R21. This turns transistor Q3 ON and shunts the DRIVE signal away from buffer B10.

Buffer B10 remains activated for a period of time, due to the feedback signal from capacitor C20. The time constant "T4" defined by the RC network comprising the resistor R22 and capacitor C20 determines how long buffer B10 is activated. Time constant T4 is adjusted to supply a short burst of power to the D.C. motor and causes the motor speed to increase a small amount. At the end of the time constant period, buffer B10 is deactivated, which through the action of buffer B11 and buffer B12 turns transistor Q2 OFF. This removes the source voltage from the D.C. motor. Since the D.C. motor is just starting to rotate, a very low back E.M.F. voltage is being generated. This is not enough to turn transistor Q3 ON, and allows the DRIVE signal to once again activate the buffer B10. This cycle is repeated until the back E.M.F. voltage from the motor is high enough to turn transistor Q3 ON. During this phase the oscillator acts as free-running multivibrator.

The E.M.F. voltage required to drive transistor Q3 is made adjustable by including a variable resistor R21 in the circuit. This determines the operating speed of the D.C. motor as sensed by the motor back E.M.F. voltage. When the motor coasts below the operating speed, transistor Q3 is turned OFF and this allows the DRIVE signal to once again activate buffer B10. This results in a short power burst to the D.C. motor. The number of these power bursts are thus automatically controlled by the speed of the D.C. motor, with each power burst resulting in a small increase in motor speed so that very little motor overspeed is produced.

The time between power bursts is made short, as determined by the time constant "T5" of the RC network comprising resistor R23 and capacitor C20. This results in very little motor power OFF time when the motor speed is below its operating speed, thereby rapidly powering the motor up to operating speed. As long as the DRIVE signal is maintained, the motor will continue operating at its regulated speed.

When the DRIVE signal is removed, buffer B10 is deactivated. This results in removing power from the D.C. motor. At the same time buffer B13 is momentarily deactivated, as determined by the time constant "T6" defined by the RC network comprising resistor R24 and capacitor C21. This turns transistor Q1 ON and momentarily shorts out D.C. motor 88, causing the motor to rapidly come to a stop.

The period during which the motor is brought up to speed and the period during which the motor is braked collectively define the end-of-encode gap S on the magnetic tape, as diagramatically illustrated in FIG. 17. By shorting the motor at the end of the recording phase, gap S is minimized.

A READY signal is also generated by the motor control circuit, and is used to activate the record clock 230 (FIG. 13). This indicates that the D.C. motor is up to operating speed and therefore, that the magnetic tape is being advanced past recording heads 82 and 83 at the recording speed and is ready to receive data.

Activation of the record clock initiates the transfer of the data bits from the encode circuit output gates G12 and G14, through the drive circuit 220 and to heads 82 and 83 for recording the data bits on the magnetic tape.

The READY signal circuit comprises the resistor-capacitor-diode network R25, R26, C22 and D20. This network recognizes when the motor is at operating speed and average voltage level at the output of buffer B12 is high. The time constant "T7" defined by the RC network comprising resistor R26 and capacitor C22 has a period sufficient to permit capacitor C22 to ignore those short intervals when the buffer output B12 is not high. The time constant "T8" of the RC network defined resistor R25, capacitor C22 and diode D20 is adjusted so that capacitor C22 is partially discharged when the output of buffer B12 is low. Thus, when the motor is being brought up to operating speed, the output of buffer B12 is generally low and the READY signal is kept low. When the motor speed is at operating level, the output of buffer B12 is generally high, and the READY signal is produced on lead 228, even though momentary power bursts are required to maintain the motor at operating speed.

In addition, buffer B14 and transistor Q4 are used to control the signal source power to the magnetic head circuit. Thus, source power is only provided to the record circuit comprising recorder heads 82 and 83 when the motor control circuit is activated. This results in considerable savings of source power. Buffer B14 drives transistor Q4 when the DRIVE signal is high and also during the time when the D.C. motor is being braked to a stop condition by the output produced at buffer B13 through diode D21. After all of the phase recording signals have been produced at gates G12 and G14 of encode circuit 200, record counter 234 produces a STOP signal on line 242. This is inputted to gate G24 (FIG. 13) for stopping the action of the motor control circuit by terminating the DRIVE signal on line 218. The motor control circuit remains inactive until a new cycle is started by the presence of a START signal on lead $\overline{214}$ which is inputted in the gate G23, signalling that eight strokes are in memory bank 184 and are ready to be unloaded into encode circuit 200.

It will be noted that transistor Q5 is driven by the output of buffer B6 through zener diode Z1. This activates a light emitting diode L1. The transistor Q5, light emitting diode L1 and zener diode Z1 collectively define an indicator circuit 265 which provides a visual signal that the motor is up to operating speed. The zener diode is utilized as a voltage level detector for indicating when the source voltage has dropped below the level which is required to drive transistor Q5 and activate light emitting diode L1. The light emitting diode is conveniently placed within the view of the operator on the top member 34 of the machine shell (see FIG. 2).

The power supply 270 for driving the present system may comprise a direct current battery source 272 or may use an external direct current supply as indicated by coupling 274. The batteries may, as stated, be housed in the recorder housing 44. When an external source is utilized, it is recommended that a current limiting circuit such as, by way of example, the circuit identified by the reference numeral 276 be used.

What is claimed is:

1. An improved recorder in combination with a shorthand machine having a keyboard comprising a set of keys wherein numerals words or parts of words correspond to keys or combination of keys; a set of binary switches in one-to-one communication with said set of keys, a first binary state of each of said switches identifying the corresponding key as a key which is activated and a second binary state of each of said switches identifying the corresponding key as a key which is deactivated during a stroke, for designating the word or numeral information of the stroke; and means producing a plurality of parallel, independent data members, one each representing the binary state of one of said switches, said improved recorder of the type adapted for recording on a recording medium in phase encoded, serialized form a single data signal presented for a period defined by a single stroke, the data signal comprising a fixed, finite number of parallel data bits at least one of which is initially of the first binary state and any of which may change binary state during the period, the recorder comprising:
   a. detecting means for producing a control signal in response to and during the continuous presence of at least one data bit of the first state, said control signal during corresponding to the period;
   b. converter means associated with the detecting means and activated in response to the control signal for sequentially scanning all of the parallel data bits comprising the data signal and for producing a corresponding serial, digital data signal comprising a finite sequence of binary data bits, any of which may change identity during the definable period;
   c. memory means coupled to said convertor means for accumulating and thereafter releasing the finite sequence of binary data bits, said memory means recognizing and accumulating as a data bit of the predetermined identity any data bit which is of said predetermined identity at any time during the definable period; and
   d. encoding means coupled to said memory means for receiving the accumulated and released data bits for producing a phase encoded, serial recording signal for recording on the recording medium.

2. Recorder means as called for in claim 1, further comprising inhibiting means associated with said detecting means for precluding the production of the period-defining control signal until at least one data bit of the first binary state is present for a specific interval of time.

3. Recorder means as called for in claim 2, wherein said inhibiting means precludes the termination of production of the control signal for a specific interval of time after termination of the presence of at least one data bit of the first binary state.

4. Recorder means as called for in claim 1, further comprising means associated with said detecting means and said memory means for precluding the production of said control signal while the accumulated data bits are being released from the memory means and introduced into the encoding means.

5. Recorder means as called for in claim 1, wherein said memory means comprises:
   a. a group of dedicated bit address stores associated with said convertor means, one bit address store for receiving, storing and thereafter releasing one data bit in the finite sequence of binary data bits;
   b. means associated with the convertor means and said group of address stores for selecting one data bit and a corresponding address store;
   c. means for introducting the selected data bit into the selected corresponding address store;
   d. a buffer store associated with said plurality of address stores for receiving and retaining the data bit stored in and released from the selected address store; and
   e. means associated with said buffer store and the convertor means for introducing a data bit of the first binary state into the said selected bit address store if either the data bit from the convertor means or the data bit retained by the buffer store is of the first binary state.

6. Recorder means as called for in claim 5, wherein a plurality of data signals are sequentially presented for independent, definable periods, and wherein said detecting means produces a separate, period-defining control signal upon detection of the first data bit of each signal which is of the first binary state, and terminates production of said signal when presentation of the last data bit of each data signal which is of first binary state is terminated, wherein said memory means comprises:
   a. a group of dedicated bit address stores for each of the plurality of data signals;
   b. means associated with said detecting means for selecting a different group of address stores in response to each period-defining control signal;
   c. clock means associated with said detecting means for producing a clocking signal in response to the termination of the last of the plurality of control signals; and
   d. means associated with the groups of address stores and responsive to said clocking signal for selecting each bit address store in sequence and for releasing the data bit stored therein and introducing it into the encoding means.

7. Recorder means as called for in claim 6, wherein the encoding means comprises:
   a. register means associated with said memory means for receiving and accumulating the released data bits and for dividing the accumulated data bits into a plurality of group signals each comprising at least one complete data signal;
   b. means associated with said register means for simultaneously producing from each group signal a phase encoded recording signal; and c. interface means associated with the recording signal producing means for simultaneously introducing the recording signals onto the recording medium.

8. Recorder means as called for in claim 6, wherein said recording medium is a magnetic tape having a plurality of channels and wherein said encoding means simultaneously produces a plurality of phase encoded, serial recording signals each comprising at least one complete data signal, wherein the phase encoded recording signals are simultaneously recorded on the plurality of magnetic tape channels with a complete data signal recorded on a single channel.

9. Recorder means as called for in claim 7, wherein said recording medium is an elongate magnetic tape, and wherein said interface means provides a magnetic phase encoded, serial recording signal for recording on the magnetic tape as it is advancing past the interface means, the recorder means further comprising:
 a. motive means associated with the magnetic tape for advancing the tape past the interface means; and
 b. control means associated with the motive means and responsive to the production of a recording signal for activating the motive means.

10. Recorder means as called for in claim 9, wherein said motive means is a rotatable electrical motor producing an output signal corresponding to its rotational speed, said motive means being at rest until activated, said control means comprising:
 a. power means for introducing a drive force to the motive means;
 b. means associated with the encoding means for activating the power means in response to the production of a recording signal; and
 c. feed back means associated with said power means for inhibiting introduction of the drive force to the motive means in response to production of a predetermined output signal produced by the motive means.

11. Recorder means as called for in claim 10, wherein said recording signal is of finite duration, said control means further comprising means associated with said encoding means and responsive to termination of the recording signal for deactivating the motive means.

12. Recorder means as called for in claim 11, wherein power means are associated with said interface means and wherein said control means activates and deactivates said power means in response to the production of and the termination of the recording signal, respectively.

13. An improved recorder in combination with a shorthand machine having a keyboard comprising a set of keys wherein numerals, words or parts of words correspond to keys or combinations of keys; a set of binary switches in one-to-one communication with said set of keys, the binary state of said switches identifying those keys which are activated and those keys which are deactivated during a stroke, for designating the word or numeral information of the stroke; and input means producing a plurality of parallel, independent data members one each representing the binary state of one of said switches, the recorder of the type for recording a data signal on a magnetic tape medium in phase encoded serialized form, the data signal being presented for a period defined by a single stroke and comprising a fixed, finite number of parallel data bits at least one of which is initially of a predetermined identity and any of which may change identity during the period, the improvement comprising:
 a. detecting means for producing a control signal in response to and during the presence of at least one data bit of the predetermined identity;
 b. inhibiting means associated with said detecting means for precluding the production of the control signal until at least one data bit of the predetermined identity is present for a specific interval of time, and precluding termination of production of the control signal for a specific interval of time after termination of the presence of at least one data bit of the predetermined identity;
 c. converter means associated with the detecting means and activated in response to the control signal for sequentially scanning all of the parallel data bits comprising the data signal and for producing a corresponding serial, digital data signal comprising a finite sequence of binary data bits, any of which may change identity during the definable period;
 d. a group of dedicated bit address stores associated with said convertor means, one bit address store for receiving, storing and thereafter releasing one data bit in the finite sequence of binary data bits;
 e. means associated with the convertor means and said group of address stores for selecting one data bit and a corresponding address store;
 f. means for introducing the selected data bit into the selected corresponding address store;
 g. a buffer store associated with said plurality of address stores for receiving and retaining the data bit stored in and released from the selected address store;
 h. means associated with said buffer store and the converter means for introducing a data bit of the predetermined identity into the said selected bit address store if either the data bit from the convertor means or the data bit retained by the buffer store is of the predetermined identity; and
 i. encoding means coupled to said address stores for receiving the accumulated and released data bits for producing a phase encoded, serial recording signal for recording on the recording medium.

14. An improved recorder in combination with a shorthand machine having a keyboard comprising a set of keys wherein numerals, words or parts of words correspond to keys or combinations of keys; a set of binary switches in one-to-one communication with said set of keys, the binary state of said switches defining those keys which are activated and those keys which are deactivated during a stroke, for designating the word or numeral information of the stroke; and input means producing a plurality of parallel, independent data members one each representing the binary state of one of said switches, the recorder of the type for recording on an elongate magnetic tape in phase encoded, serialized form a data signal presented for a definable period corresponding to a stroke, the data signal comprising a fixed, finite number of parallel data bits at least one of which is initially of a predetermined identity and any of which may change identity during the definable period, the improvement comprising:
 a. detecting means for producing a period-defining control signal in response to and during the presence of at least one data bit of the predetermined identity;

b. convertor means associated with the detecting means and activated in response to the control signal for sequentially scanning all of the parallel data bits comprising the data signal and for producing a corresponding serial, digital data signal comprising a finite sequence of binary data bits, any of which may change identity during the definable period;

c. memory means coupled to said convertor means for accumulating and thereafter releasing the finite sequence of binary data bits, said means recognizing and accumulating as a data bit of the predetermined identity any data bit which is of said predetermined identity for any time during the definable period;

d. encoding means coupled to said memory means for receiving the accumulated and released data bits for producing a phase encoded, serial recording signal for recording on the recording medium;

e. means associated with said detecting means and said memory means for precluding the production of said control signal while the accumulated data bits are being released from the memory means and introduced into the encoding means;

f. interface means associated with the encoding means for introducing the recording signal onto the magnetic tape;

g. motive means associated with the magnetic tape for advancing the tape past the interface means; and h. control means associated with the motive means and responsive to the production of a recording signal for activating the motive means.

15. A recorder as called for in claim 14, wherein said motive means is a rotatable electrical motor producing an output signal corresponding to its rotational speed, said motive means being at rest until activated, said control means comprising:

a. power means for introducing a drive force to the motive means;

b. means associated with the encoding means for activating the power means in response to the production of a recording signal; and c. feed back means associated with said power means for inhibiting introduction of the drive force to the motive means in response to production of a predetermined output signal produced by the motive means.

* * * * *

UNITED STATES PATENT AND TRADEMARK OFFICE
CERTIFICATE OF CORRECTION

PATENT NO. : 4,205,351
DATED : May 27, 1980
INVENTOR(S) : Richard A. Michals

It is certified that error appears in the above-identified patent and that said Letters Patent are hereby corrected as shown below:

Column 13, line 57, before the word "change" insert the word -- a --.

Column 15, line 2, change the numeral "200" to -- 220 --.

Column 15, line 11, change the word "place" to -- phase --.

Claim 1, column 19, line 46, change the word "during" to -- duration --.

Signed and Sealed this

Fifth Day of August 1980

[SEAL]

Attest:

Attesting Officer

SIDNEY A. DIAMOND

Commissioner of Patents and Trademarks